US008568642B2

(12) United States Patent
Jackson et al.

(10) Patent No.: US 8,568,642 B2
(45) Date of Patent: Oct. 29, 2013

(54) METHOD OF FABRICATING A ROBOTICS SKIN SYSTEM HAVING INTEGRAL ACTUATION POINTS

(75) Inventors: Philip John Jackson, Glendale, CA (US); Bryan S. Tye, Canyon Country, CA (US)

(73) Assignee: Disney Enterprises, Inc., Burbank, CA (US)

(*) Notice: Subject to any disclaimer, the term of this patent is extended or adjusted under 35 U.S.C. 154(b) by 298 days.

(21) Appl. No.: 12/970,471

(22) Filed: Dec. 16, 2010

(65) Prior Publication Data

US 2012/0156419 A1 Jun. 21, 2012

(51) Int. Cl.
*B29C 39/10* (2006.01)

(52) U.S. Cl.
USPC ............................. 264/277; 428/99; 901/50

(58) Field of Classification Search
None
See application file for complete search history.

(56) References Cited

U.S. PATENT DOCUMENTS

| 7,113,848 | B2 * | 9/2006 | Hanson .......................... 700/245 |
| 2003/0110540 | A1 * | 6/2003 | Fukui et al. ..................... 901/50 |
| 2009/0202854 | A1 * | 8/2009 | Jackson et al. .............. 428/542.8 |
| 2009/0289391 | A1 * | 11/2009 | Tye et al. ...................... 264/219 |

OTHER PUBLICATIONS

Hanson, D. "Applications of EAP to the Entertainment Industry." in: Bar-Cohen, Y., Electroactive Polymer (EAP) Actuators as Artificial Muscles: Reality, Potential, and Challenges [online]. (2nd ed. Bellingham, WA, SPIE Press, 2004) [retrieved on Nov. 27, 2012]. Retrieved from Knovel using Internet, <URL: http://www.knovel.com> pp. 640-642, 649-653.*
"mount." in: The Penguin English Dictionary [online], [retrieved on Nov. 29, 2012]. Retrieved from Credo Reference using Internet, <URL: http://www.credoreference.com/entry/penguineng/mount1> (hereinafter "Penguin English Dictionary").*

* cited by examiner

*Primary Examiner* — Christina Johnson
*Assistant Examiner* — David Schmerfeld
(74) *Attorney, Agent, or Firm* — Marsh Fischmann & Breyfogle, LLP; Kent A. Lembke

(57) ABSTRACT

A method for fabricating an artificial skin system for use with a robotics assembly. The method includes providing a mold core with an exterior surface defining an inner surface of a skin system, with this surface including a plurality of mounting elements. The method includes attaching, to each of the mounting elements, an elastomeric actuation piece or point (EAP). The mold core is positioned within an exterior skin mold, and a cavity is formed between the exterior surface of the mold core and inner surfaces of the exterior skin mold that defines topography and dimensions of the skin system. The method includes filling the cavity with skin-forming material. Then, after the skin-forming material hardens to form the skin system, the method includes removing the skin system from the mold core including detaching the EAPs from the mounting elements, and the EAPs are integrally bonded within the skin system.

9 Claims, 6 Drawing Sheets

METHOD OF FABRICATING A ROBOTICS SKIN SYSTEM HAVING INTEGRAL ACTUATION POINTS

BACKGROUND OF THE DESCRIPTION

1. Field of the Description

The present description relates, in general, to creating realistic skin or skin systems fix robots or for use with robotics or other applications in which skin or similar coverings are applied (e.g., robotics used to simulate movement of a human's or a character's face, hands, or the like). More particularly, the description is directed to methods of fabricating skin systems (and skins formed using such methods) for applying over robotics that better facilitate connection to robotic actuators or drivers so as to enhance durability of the skin while also providing more realistic skin movements such as facial expressions or movement while the character is "speaking" (e.g., providing natural lip, mouth, and surrounding facial feature movement when a robotic head is operated to simulate speaking).

2. Relevant Background

Durable materials that are often also flexible and elastic such as plastics and rubbers are used in many applications to create coverings or skins that are applied over an internal physical support structure or skeleton. For example, skins or skin systems are used to create realistic models of humans, animals, and characters, and when combined with robotics, such models may accurately simulate live beings.

Robotics involves the design and use of robots such as to provide programmable actuators or drivers to perform tasks without human intervention, and there have been significant demands for robotic devices (or robots as these terms may be used interchangeably) that simulate humans, animals, and other living beings or characters. These robotic characters are relied upon heavily in the entertainment industry such as to provide special effects for movies and television and to provide robots for use in shows and displays in amusement or theme parks. For example, robotics may be used to provide a character in a theme park ride or show that repeats a particular set of movements or actions (e.g., programmed tasks) based on the presence of guests or a ride vehicle or another triggering event.

It is likely that the interest in robotics will continue to expand in the coming years, and a growing area of interest is how to provide robots that appear more realistic. Many robotics companies have focused on creating robots with software, processing hardware, and mechanical actuators or drivers that allow the robots to behave more like the natural creature that is being simulated. Much work has been done to create robots that can move and even, behave similar to humans such as by manipulating objects with mechanical assemblies that behave like hands configured to be human-like. Significant effort has also been directed to providing robots with realistic facial animation such as having a robot open and close its mouth to provide lip synchronization with output audio (e.g., with speech) and by providing particular facial movements including eye movement such as frowning, smiling, and the like. While many advances have been made in realistically simulating the physical movement and facial movement of a character, problems with maintaining a realistic or desired movement or facial animation still occur when the robotics (e.g., internal components of a robot including mechanical/structural portions as well as software, hardware, power systems, and the like) are covered with a skin or skin system. For example, a robot used to simulate a particular creature would be covered with skin or a covering assembly to imitate the natural or desired covering for the creature such as skin and fur/hair for many creatures, clothes for some creatures such as humans or characters (e.g., characters from animated films or television or puppets), or a more fanciful covering system such as a metallic suit or any other desired covering.

In simulating humans or human-like characters, the robotics are typically covered in a skin that is fabricated of flexible material to move naturally with the underlying robotics. The skin may be formed of a rubber material or a silicone that is attached or anchored to the mechanical actuators or drivers of the robotic system, and the skin is configured to have an outward appearance similar to the character or creature being simulated by the robot. For example, the facial skins can he formed so as to have an uncanny resemblance to the character (or person) they are imitating, but often this resemblance ends when the attached robotics begin animating the face. The connection or anchoring points become apparent as the skin is pulled or pushed from behind. Additionally, the movement may be undesirably localized with movement, only at the point of attachment, whereas a human face generally stretches and contracts more as a unit (or the movement is more widespread across the face), e.g., a human's skin around their nose and eyes may move when skin around the mouth moves while a typical robotic skin may only move near the connection point with the manipulating robotics.

Currently, a skin system for a robot is made using a manual process relying on skill and experience of the craftsperson creating the skin and requiring many man-hours to prototype and later fabricate based on the prototype. In the existing process, a sculpture is created, such as from clay or other moldable/shapeable materials, to represent the exterior skin shape (e.g., a person's face, a character from a movie, and so on). The sculpture is then molded, and sheet wax or a layer of clay is laid by hand into this exterior mold to define a desired thickness for the exterior skin layer. An interior core is then fabricated by hand such as by using fiberglass and resin. Fiberglass or a similar material is used to form a mold from this core, and hard shells, e.g., fiberglass shells to support the skin when the robot is later assembled, are then created from this core mold. An exterior skin can finally be formed by pouring a rubber or other flexible material into the gap between the exterior mold (with the sheet wax removed) and the core mold. After it is set, the skin is removed from the molds and placed on the supporting or hard shell(s) and attached to portions of the robotics.

As discussed above, the realism of the movement of the skin may be spoiled as the skin moves more or unrealistically at the connection point between the skin and the robotic driver or actuator. Presently, the connection points are provided after the skin is removed from the mold. Application of the connection points may involve gluing a dot or connection point component onto the inner surfaces of the skin, and then connecting the connection point component to the robotics. For example, the connection point may be configured as a socket of a rubber or soft material similar to that of the skin, and the robotic actuator may have a ball-shaped head at its end so as to provide a ball and socket-type attachment at this point of the skin when it is inserted into the connection point component. Glue may also be used to bond snaps, Velcro or similar fabric, metal/plastic plates with holes, and the like onto the inner or back surface of the skin that then mates with the robotic actuators so as to affect skin movement. Instead of using glue, some mounting techniques call for melting the hardened skin and then adding snaps or pads to the skin surfaces.

These techniques for providing connections with between the skin and robotics have not been entirely successful in meeting the needs of the robotics industry. Each of these processes is post-skin making such that the connecting components will often not effectively stand up under ongoing wear and tear of a repeated motion of the underlying or driving robotics. The non-integral components, which are often of an incompatible or non-similar material, tend to tear or work their way out of the skin or break the glue-based bonding to the skin. The use of dot or point connection points often will not provide a realistic movement of the skin as the forces applied by the robotics actuators or drivers are applied as point forces. Since the connection point components are added after the skin is removed from the core and mold, the application of the connectors often relies on the skill and experience of the artisan and is difficult to accurately position each of the connectors so as to obtain a desired and predictable connection location on the skin surface with the robotics (e,g,, two people may glue the same connection component at two slightly offset location so as to create differing skin movements with similar robotics actuation).

SUMMARY OF THE INVENTION

The present description addresses the above and other problems associated with providing a skin or skin system that can be used to cover a robotics device such as a head and connect with actuators or drivers of the robotics device so as to move in a more realistic manner. To this end, a skin fabricating method is taught that includes determining desired and useful connection points for the skin with a robotics shell (e.g., an outer shell in which one or more robotics drivers or actuators are housed) and for the skin with robotics drivers via such a shell. A core or inner skin mold is provided that includes posts or connectors similar to those used to link/connect the skin with the shell and/or robotics drivers (e.g., actuators including rods with balls at their ends or the like).

Elastomeric actuation points or pieces (EAPs) are positioned on each of these core posts/connectors. The core is then enclosed in an external skin mold assembly, which defines a cavity about the outer surfaces of the core and its EAP-covered posts/connectors, and a pour is performed to fill the cavity with a volume of a rubber, silicone, or other skin-forming material. The material is allowed to harden, and, during such hardening, a skin or skin system is formed in which the EAPs are integrally formed or bonded. Once hardened, the mold is disassembled and the skin removed from the core with the EAPs permanently in place and ready for use. In some embodiments, the method further includes applying the skin over a robotics assembly with each of the EAPs connected to either the robotics outer shell or a robotics driver/actuator or link element to such driver/actuator.

In contrast to existing post-skin forming techniques, the skin fabricating method described herein provides the EAPs as part of the skin making process in a highly accurate way (e.g., the EAPs are accurately positioned on the inner or back surface of the skin using the core's posts/connectors). The inventors have designed and utilized EAPs with differing shapes. These shapes were made to enhance a particular desired skin movement in a specific area of the skin system and/or its underlying robotics. For example, smaller circular (or other shaped) buttons may be used to provide robotics shell to skin connection locations, and such EAPs may be considered "locking EAPs." Another set of EAPs may be connected to the robotics actuators/drivers and typically are larger in size than the locking EAPs. These EAPs may be considered "force-distributing EAPs" (or "load-spreading EAPs") and may take differing shapes and sizes (and/or one, two, or more materials with differing hardnesses such as two, three, or more durometer hardnesses such as with a hardened (e.g., vulcanized rubber) core for mating with robotics and a softer surrounding body (e.g., foam silicone or the like) with an even softer (lower hardness) tip(s) or wing(s)) from each other and/or from the locking EAPs so as to better distribute forces throughout the skin material to which these EAPs are integrally bonded when they are selectively, mechanically actuated with the robotics.

In use, the inventors have proven the use of the EAPs in a skin system applied to a robotics assembly created to simulate a human head to provide animation of the skin that represents a substantial advancement in realistic facial movement. The integral bonding of the EAPs, which preferably have shapes that are sympathetic with the skin features or components being driven (such as two or more spaced apart EAPs with wings extending out from a circular body being used to distribute force in a lip rather than a single large tube), is believed to facilitate this realistic skin movement. The bonded-in-skin material (rubber or the like) EAPs are extremely durable, which means that the skin lasts longer when compared with glued on sockets or the like. This reduces maintenance requirements and eliminates the need for frequent replacement of skins, which lowers overall costs of such skin systems. The bond between the skin material and the surfaces of each EAP is far superior to that achieved with an adhesive. The EAPs may be manufactured using industrial processes that produce strong and durable parts. The shapes of the EAPs not only can make skin movement more realistic but also can act to better spread out stresses in the skin experienced during animation so as to reduce wear and tear, e.g., block or end tear paths previously found at valleys or sharp corners of the skin such as at the corner of a mouth or the like.

More particularly, a method is provided for fabricating an artificial skin system such as for use over or on a robotics assembly (e.g., a robotic head or the like in which realistic skin movement or animation is prized). The method includes providing a mold core with an exterior surface defining an inner surface of a skin system, and the exterior surface may include a plurality of mounting elements (such as mounting posts with ball-shaped heads or bulbous tips or the like). The method also includes, to each of the mounting elements, attaching an elastomeric actuation piece or point (EAP). Then, the method involves positioning the mold core within an exterior skin mold, and a cavity is formed between the exterior surface of the mold core and inner surfaces of the exterior skin mold that defines a topography and dimensions of the skin system (such as the features of a face such as a nose, eyes, eyebrows, and a mouth including upper and lower lips). The method includes filling the cavity with a volume of a skin-forming material (e.g., pouring liquid rubber such as a silicone into the mold to cover the mold core including the EAPs). Then, after the skin-forming material hardens to form the skin system, the method includes removing the skin system from the mold core including detaching the EAPs from the mounting elements. At this point in the method, the EAPs are integrally bonded within the skin system to surrounding portions of the skin-forming material.

In some embodiments, the providing of the mold core step includes fabricating the mold core based on a robotics assembly (or its specific shape, dimensions, and components) that includes an outer shell/housing with skin locking elements and with a number of robotic actuators extending through the outer shell. A first number of the mounting elements of the mold core match a configuration and location of the skin locking elements and a second number of the mounting elements of the mold core match a configuration and location of linking elements of the robotic actuators, whereby the EAPs are accurately mapped within the skin system with mounting points on the robotics assembly. In such embodiments, the method may further include attaching the skin system to the robotics assembly by attaching the EAPs to corresponding ones of the skin locking elements and linking elements to provide a skin-covered robotics assembly or a skinned robot character or the like. Also, in these embodiments, a number of the EAPs mounted on the second number of the mounting elements may include a body for mating with the linking elements of the robotic actuators and at least one wing, with a tapering width, extending outward from the body to distribute forces applied to the body outward into the surrounding skin system.

In some embodiments of the method, each of the EAPs includes a body with an outer wall formed of an elastomeric material. In such cases, the skin-forming material used in the filling or pouring step may be an elastomer such as a silicone compatible with the EAP elastomeric material of the body (and tails/wings/arms for some EAPs) to provide the integral bonding during the filling step. In some cases, at least a subset of the EAPs each includes a bearing element within the body adapted for mating with one of the mounting elements. In such implementations, the bearing element is formed to have a hardness greater than a hardness of the body. It may be useful to perform the method such that, after hardening, the skin system has a first hardness and the body of the EAPs has a second hardness greater than the first hardness (e.g., a second hardness that is at least about a 50 Durometer hardness) to increase durability.

According to another aspect of the description, an artificial skin (or skin system) is provided for use with a robotics assembly. The robotics assembly may have an outer shell with skin-locking connectors on an exterior surface and actuators with connecting links extending through the outer shell. The skin includes a sheet of flexible elastic skin material with an exterior surface and an inner surface for mating with the exterior surface of the outer shell. The skin also includes a plurality of elastomeric actuation pieces (EAPs) adapted for coupling with the skin-locking connectors. The skin-locking EAPs are integrally bonded within the sheet of skin material with a body with a coupling element accessible via the inner surface of the sheet of skin material. Further, the skin includes a plurality of EAPs adapted for coupling with the connecting links of the actuators and distributing forces applied by the actuators within the sheet of skin material. The force-distributing EAPs are integrally bonded within the sheet of the skin material with a body including a coupling element accessible via the inner surface of the sheet of skin material.

In some embodiments of the artificial skin, the body (of at least a portion of the EAPs) proximate to the coupling element has a hardness greater than a hardness of the sheet of skin material (e.g. the entire body may be harder than the surrounding skin or a harder bearing element may be provided as the coupling element of the EAP). Specifically, the body abutting the sheet of skin material may have a hardness less than the coupling element hardness (e.g., a hardness and material matching that of the surrounding skin). In some embodiments, a portion of the force-distributing EAPs each have at least one tapered wing extending outward a distance from the body, whereby loads are spread through the surrounding skin material.

In some particularly useful cases, the robotics assembly is adapted to provide an animatronic head, and the sheet of skin material includes a mouth with an upper and a lower lip each actuated by at least two of the actuators of the robotics assembly. In this example, at least a first and second one of the force-distributing EAPs, which are separated by a gap, are positioned in each of the upper and lower lips to mate with the connecting links of the lip actuators. Then, the first and second force-distributing EAPs each may include a wing extending outward from the body toward the other one of the force-distributing EMS, and the sheet of skin material may further include at least one of the skin-locking EAPs at mating corners of the upper and lower lips for mating with corresponding ones of the skin-locking connectors to provide barriers to skin tearing in the mouth.

DETAILED DESCRIPTION OF THE PREFERRED EMBODIMENTS

Briefly, embodiments of the present invention are directed to fabrication methods for products or items that include skin systems (e.g., robots or other structures/assemblies that incorporate skin systems) for providing extremely realistic looking facial movement or animation or providing a desired covering of an internal structure and/or moving parts. The following description highlights the use of the assembly and fabrication methods with robotics-based products and devices and, particularly, a robotic head, but the concepts described are readily extended to other applications in which an internal structure or support is covered with a skin or covering. The following discussion begins, with reference to FIG. 1, with a fabrication and assembly method for a robotics device or apparatus covered by a skin system with integral elastomeric actuation points or pieces (EAPs). During the discussion of the method of FIG. 1, the steps of the method are described in more detail with reference to the other supporting figures such as to show a core with mounting or connecting posts, to show the application of EAPs to the core prior to performing a pour into the mold, and to show a resulting skin. The discussion will also stress the use of load-spreading or force-distributing EAPs of various sizes and shapes to achieve enhanced skin animation when compared with prior skin-to-robotics connecting techniques.

Figure 1:
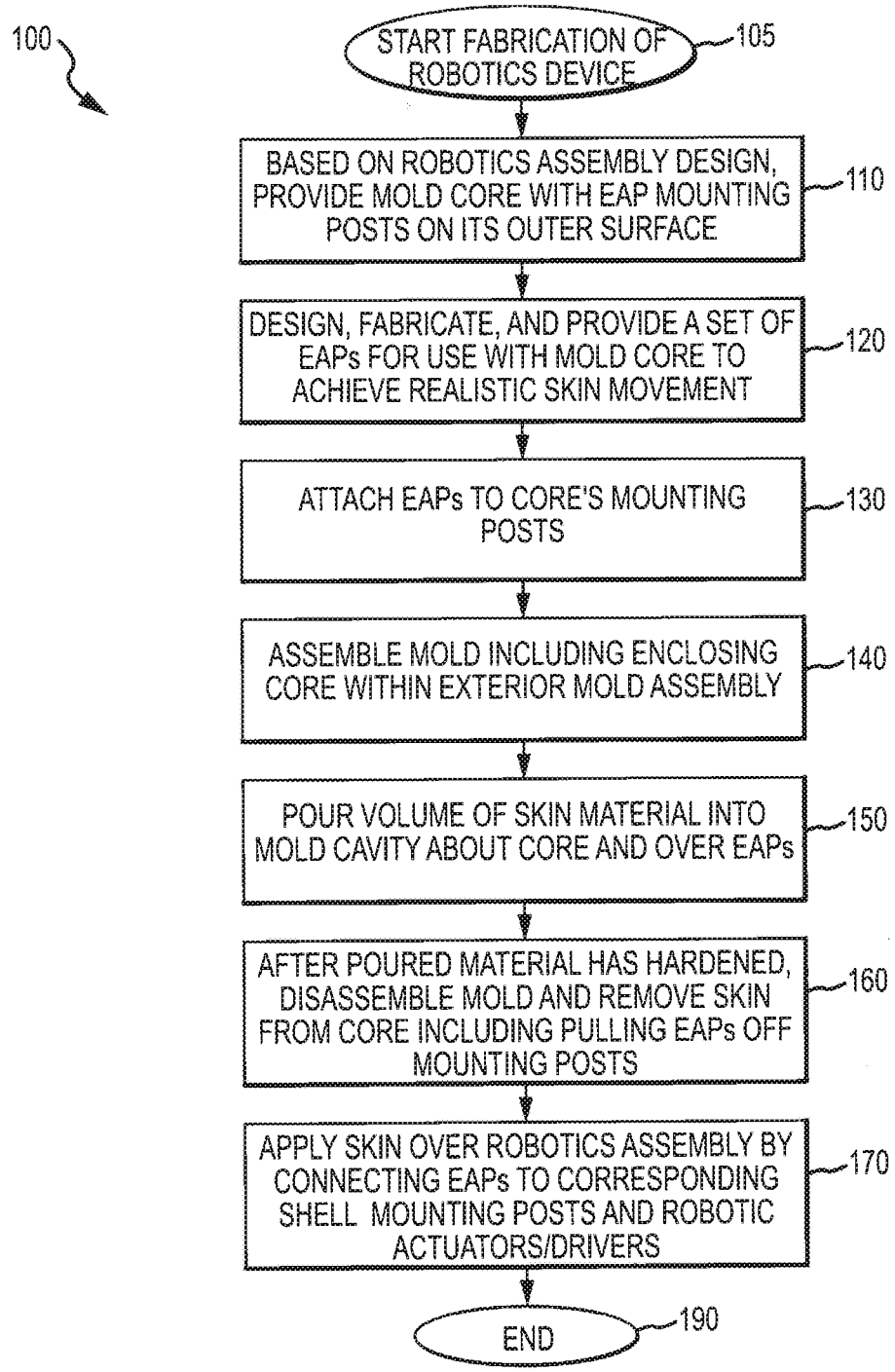
FIG. 1 is a flow diagram for a process or method of assembling a product or device, such as a robotic character (in this non-limiting example, a robotic-actuated head), having a robotics assembly and an exterior artificial skin or skin system with integrally formed EAPs.

FIG. 1 illustrates a method 100 of fabricating a robotics device such as a robotic head in which it is very desirable to have realistic and natural skin movement with underlying robotics devices such as actuators or drivers that are coupled/connected to a skin. The method 100 starts at 105 such as with an object or character to be modeled with a robotics device. For example, it may be desirable to provide a robotics device that can be manipulated to simulate a human speaking or singing, and it may be desirable that the skin and underlying robotics closely replicate a well-known person such as a national leader, a music star, a movie character/actor, or the like. In such cases, the skin and robotics are specially designed to provide animation that replicates the particular bodily features of the person as well as their peculiar mannerisms and facial movements, e.g., a particular way of raising an eyebrow, a manner of frowning or smiling, and so on.

In such cases, the method 100 may start at 105 with creating a sculpture, such as from clay or other moldable/shapeable materials, to represent the exterior skin shape (e.g., a person's face, a character from a movie, and so on). The sculpture is then molded, and sheet wax or a layer of clay is laid by hand into this exterior mold to define a desired thickness for the exterior skin layer. An interior core is then fabricated by hand such as by using fiberglass and resin. In other embodiments, the sculpture is scanned to create a 3D digital model of the desired skin, and this 3D digital model is used to design a robotic assembly including an outer shell for supporting the skin and also for providing access points/ports for the robotic drivers/actuators. Fiberglass or a similar material is used to form an exterior mold assembly from the core that defines the outer surfaces of the skin, and hard shells, e.g., fiberglass shells to support the skin when the robot is later assembled and to house the robotics, are then created from this core mold. An exterior skin can now be formed by pouring a rubber or other flexible material into the gap between the exterior mold (with the sheet wax removed) and the core mold. After it is set, the skin can be removed from the molds and placed on the supporting or hard shell(s) and attached to portions of the robotics.

Specifically, the method 100 includes the step 110 of using the above-described design of the robotics assembly to then provide the mold core. The mold core is fabricated based on the design of the outer hard shell/housing for the robotics as this is useful for defining the core's outer surface shape and/or topography as well as defining a plurality of connection points or locations for attaching the inner surfaces of the skin to the robotics outer shell/housing. Further, the mold core is designed and provided based on the location of connection or coupling points between the inner surfaces of the skin and robotics drivers/actuators. In other words, the core in step 110 is fabricated to provide precisely located connection posts both for skin-to-robotics shell coupling and for skin-to-robotics coupling (e.g., locations where force or load will be applied to the skin to move or animate it during operation of the covered/underlying robotics assembly).

Figure 2:
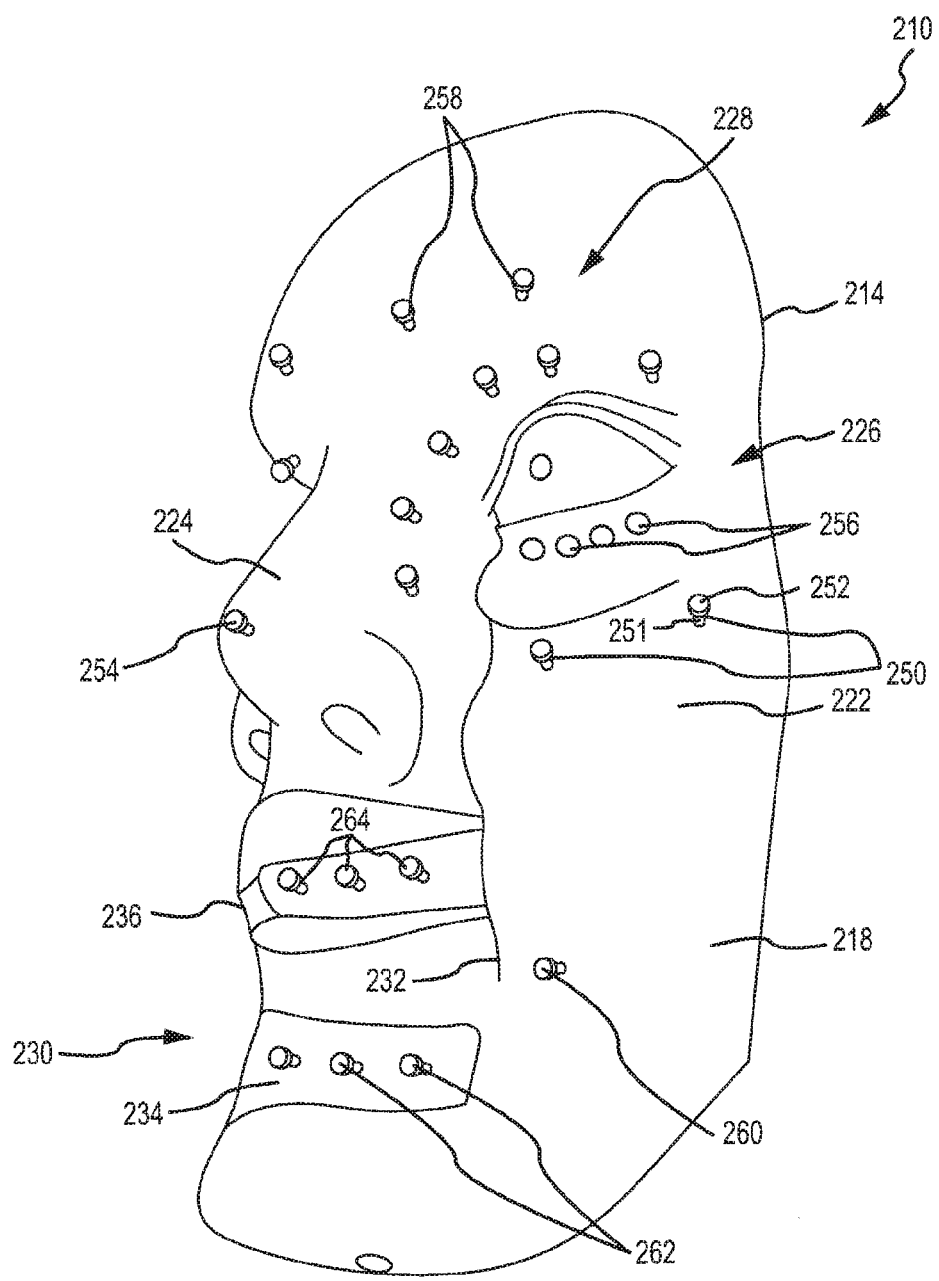
FIG. 2 is a side perspective view of a portion of a mold core (or inner skin defining mold component) that is fabricated with a number of mounting posts or connectors for precisely locating EAPs within a skin molded using the core and for supporting the EAPs during the skin pour and hardening steps of the skin fabrication process.

Referring to FIG. 2, a portion (e.g., the face or front portion) of a mold core 210 is illustrated that may be provided according to steps 105 and 110 of the method 100. The core 210 includes a body 214 with an exterior surface 218, which defines an inner surface of a cavity between the core and an exterior mold assembly that is later used to encase the core in step 140 of method 100. The exterior surface 218 defines a number of facial features including a cheek 222, a nose 224, an eye 226, an eyebrow 228, and a mouth 230 with lower and upper lips 234, 236.

Significantly, the core 210 includes a plurality of EAP mounting posts upon which EAPs can later be positioned so as to accurately locate the EAPs and retain them during pouring of skin-forming material into the mold cavity over the core 210. Some of the EAP mounting posts are located in areas where it may be useful or desirable to simply connect the inner surfaces of the later-formed skin to the outer shell or housing of the robotics that will be covered by such skin. For example, some portions of the skin will not be directly moved by the robotics as the object/character they are simulating does not have a moving part or feature at such a location. As shown, the core is used to form a facial skin, and the cheek 222, nose 224, and mouth corners 232 may be portions of the skin that will not be driven or actuated directly by a robotic actuator or driver, and one or more mounting posts 250, 254, and 260 may be provided on these features of the exterior core surface 218 (e.g., for receiving locking EAPs).

Each mounting post is configured to mate with and retain an EAP, and, when the EAPs include recessed surfaces or sockets, the mounting posts, such as posts 250, may each include an elongated body 251 that extends outward from the surface 218 some distance (e.g., a relatively small offset such as less than about 0.25 inches and often less than 1/16 to 1/8 inches for many EAPs) to a point where a head or tip 252 is provided (e.g., a ball or similar shape for insertion into a EAP socket when the EAPs and posts are configured as ball and socket type connectors). Of course, a wide variety of connection configurations may be used to allow the mounting posts to receive and retain EAPs, and, in some cases, the mounting posts are adapted to take a form similar to or even identical to that of the connecting portions of robotic actuators/drivers (e.g., if these rods/arms have a ball type connector than so do the mounting posts as shown for posts 250).

Use of mounting posts with similar shapes to the ends of connectors to robotic actuators/drivers is particular useful for the mounting posts provided for receiving the force-distributing EAPs. For example, the core 210 may be configured to provide a plurality of mounting posts at locations exactly corresponding with connection locations for robotic drivers and actuators of a robotics assembly (e.g., where a driver arm or rod extends out from a hard outer shell or housing to connect with and animate a skin).

With this in mind, the core 210 includes features that correspond with portions of a face that may move directly (e.g., in response to muscle, bone, or tissue movement), and these may include the eye 226, the eyebrow 228, and the mouth 230. For the eyebrow 228, a pair of EAP mounting posts 258 are provided as, in this design, two spaced-apart EAPs will be used to distribute load or forces used to move the eyebrow portion of the later-formed skin. Similarly, the mouth 230 is shown to include two or more (here three) spaced-apart mounting posts 262, 264 for each of the lower and upper lips 234, 236 to receive load-spreading EAPs, and, by positioning the mounting posts in locations that accurately are mapped to the corresponding robotics assembly, the EAPs are also accurately located in the later-formed skin such that the skin can readily be attached to the robotics assembly (with its skin locking posts and actuator/driver connection points/members).

In addition to mounting posts, the core 210 includes mounting elements 256 that are used to mount EAPs in the form of ferromagnetic strips (or other shapes), which are actuated magnetically instead of via direct coupling to actuators/drivers. These mounting elements 256 may, therefore, take the form of strong permanent magnets (such as rare earth magnets in button or other fauns) that are positioned to be flush with the exterior surface 218. As with the other mounting elements/posts, the mounting elements 256 are accurately positioned on or proximate to the exterior surface 218 of the core 210 such that an EAP applied to the elements 256 is automatically or necessarily accurately aligned with a magnetic actuator as the core 210 is designed and provided in step 110 based upon a particular robotics assembly design.

Returning to FIG. 1, the method 100 continues at 120 with designing, fabricating, and providing a set of EAPs for use with a core fabricated and provided in step 110 (such as core 210). The EAPs are designed to provide realistic skin movement, and the locking EAPs work in conjunction with the load-spreading EAPs to achieve desired movement or animation of the skin containing these EAPs in response to application of forces by robotic actuators/drivers connected to the EAPs. In step 130, the EAPs are attached to the core's mounting posts.

Figure 3:
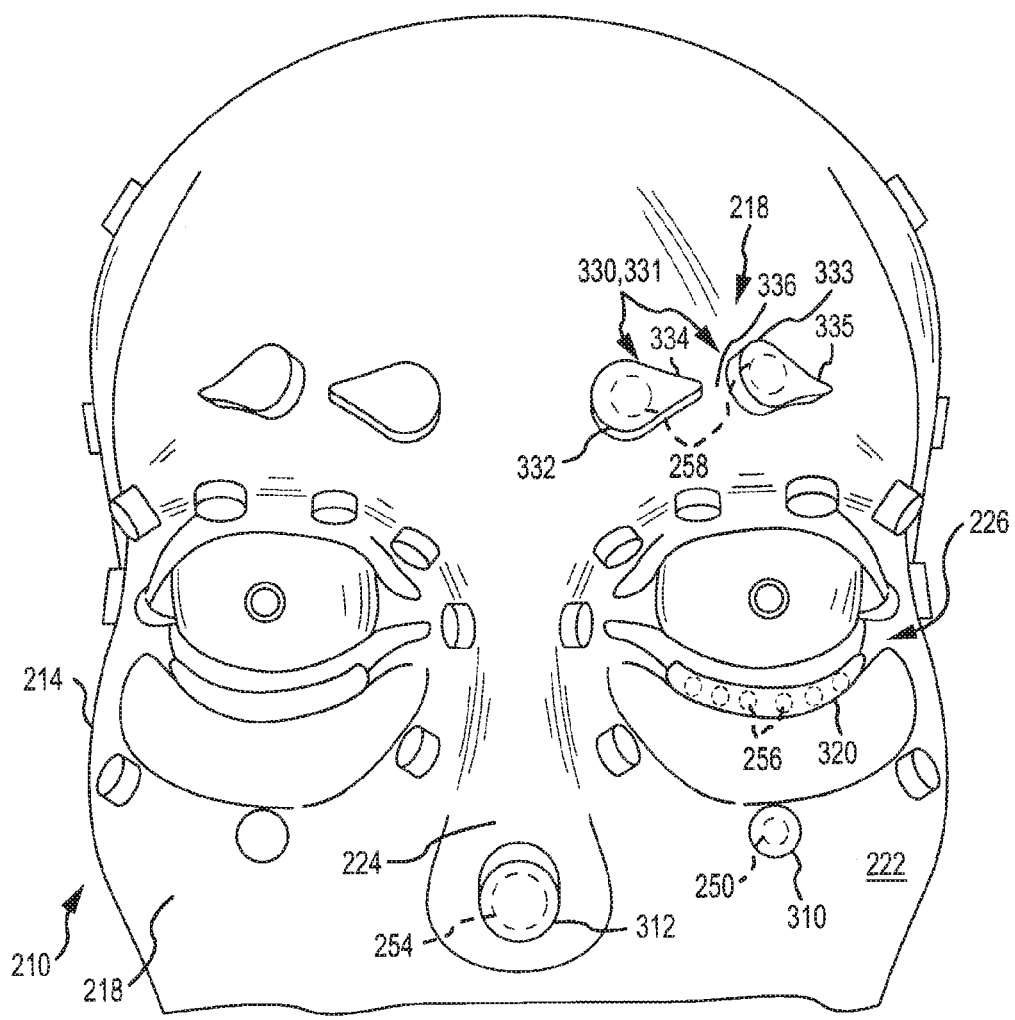
FIG. 3 illustrates a front view of a portion of the mold core of FIG. 2 showing the top of the core (e.g., the portion containing the eyes, eye brows, cheek, and nose corresponding to like parts of a robotic assembly to be covered with a skin formed with the core) after the application of locking and force-distributing EAPs to the mounting posts or connectors on the outer surface of the mold core.

FIG. 3 illustrates the upper portion of the core 210 after completion of steps 120 and 130 of method 100. As shown, a plurality of locking and load-spreading EAPs have been attached the exterior surface 218 by coupling them with the mounting posts/elements. For example, skin-locking EAPs 310 and 312 have been coupled (such as with a ball and socket-type connection) with posts 250, 254 on the cheek 222 and nose 224 of the core 210. The locking EAPs 310, 312 may take the form of buttons or circular pads (or other-shaped pads) as shown, with relatively small diameters or size/surface area, to attach the encircling skin (after skin forming step 150) to a robotics assembly shell or housing surface. The locking EAPs are typically located in portions of the skin (and the mounting posts 250, 254 on surface 218) that will not move during operation of the underlying robotics or move only slightly in response to movement of adjoining portions. For example, a person's facial skin has a number of areas that generally may be thought of as non-moving or as anchor points such as the tip of their nose and upper cheeks.

In contrast, though, portions of the facial skin (or other skin system) will move directly such as an eyebrow or an eyelid. To support such direct movement in a realistic manner, FIG. 3 shows application of a number of force-distributing EAPs onto the core surface 218. Specifically, an EAP 320 in the form of a ferromagnetic strip is applied over the mounting elements 256 such that this strip is positioned in the eyelid of a skin formed with core 210. Also, on eyebrow 218 of core 210, a pair of EAPs 330, 331 is applied on mounting posts 258 to provide load-spreading EAPs in the eyebrow portion of a skin formed with core 210.

Note, two EAPs 330, 331 are used in the place of a single larger EAP, which may be used in some cases, as a more realistic eyebrow motion may be achieved with two robotic actuators or two robotics connection points. Each EAP 330, 331 is shaped similar to a raindrop with a circular body 332, 333 that mates with the post 258 and with a tail or wing 334, 335. The tail 334, 335 extends outward from the body 332, 333 and reduces in size/width such that at its tip (or end distal to body 332, 333) the tail 334, 335 is much more flexible. Further, the tail 334 of the first EAP 330 is spaced apart by a gap 336 from the body 333 of the second EAP 331 such that the two EAPs 330, 331 move at least partially independently. The use of a tail/wing 334, 335 in combination with the gap 336 and two EAPs 330, 331 provides a more realistic eyebrow movement as it spreads applied forces provided by robotic actuators/drivers in a manner that effectively simulates a human eyebrow movement. The use of a plurality of locking EAPs placed about the socket of eye 226 helps to stabilize the skin in these locations when the skin is applied to a robotics assembly, and this locking of the skin (such as with EAP 310) when combined with movement of the skin with two specially shaped EAPs (such as EAPs 330, 331) acts to create a skin movement that closely replicates that of a human's face near their eye.

The number of EAPs, the EAP shapes used, their locations, and whether they are locking or force-distributing EAPs may be varied widely to practice the invention. The inventors have found that EAPs with wings, tails, or other portions that extend outward from the body are useful for many of the EAPs that are used to connect to the robotics as these shapes limit issues previously seen with point application of animation/skin-moving forces. The teardrop or raindrop shapes shown for EAPs 330, 331 have proven to provide a skin movement that accurately simulates human skin movement with underlying skin attachment points.

Figure 8:
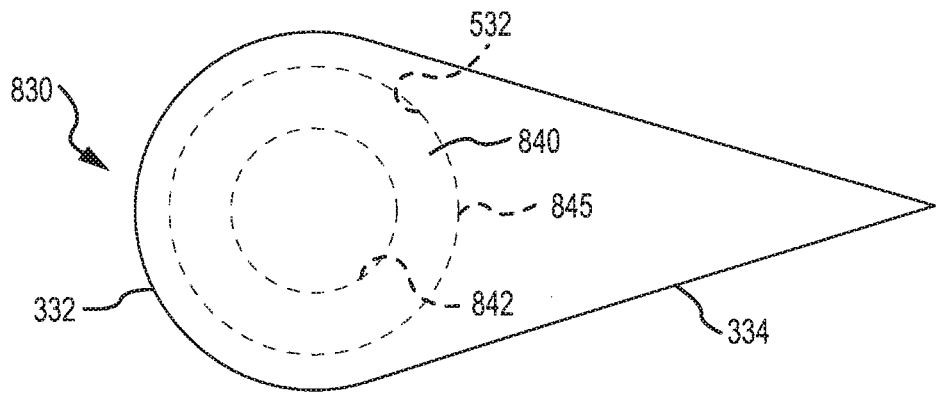
FIG. 8 illustrates another load-spreading EAP similar to FIG. 6 but including a post-mating member within the body that may be fabricated with processes and/or materials so as to provide robotics/actuator-mating surfaces with greater hardness/durability than the body and wing/tail of the EAP.

The material chosen for the EAPs may also vary to practice the method 100 and form a useful skin. The material may be chosen to be a material that is compatible with the material used to form the skin such that when the skin-forming material is poured over the EAPs and allowed to harden (see step 150 of method 100) it integrally bonds with the skin material. In this manner, the adjoining skin either is held stationary by the EAP (such as with locking EAPs) or moves with the EAP (such as with force-distributing EAPs). In many cases, the material chosen of the EAPs is chosen to suit its function with a hardness matching or exceeding that of the surrounding skin used for the locking EAPs and a hardness that exceeds, and, in some cases, is substantially greater than the surrounding skin being used for the force-distributing EAPs (e.g., to increase the durability of these load bearing surfaces/components). For example, some EAPs (or an inner bearing component as shown in FIG. 8) are formed of vulcanized rubber and/or a higher hardness silicone such as a silicone rubber with a 50 to 60 Durometer or greater hardness. The inventors have used such EAPs for both the locking and load-spreading EAPs with excellent results including long lives with repeated animation of the skin with robotics without tearing or failure.

Figure 4:
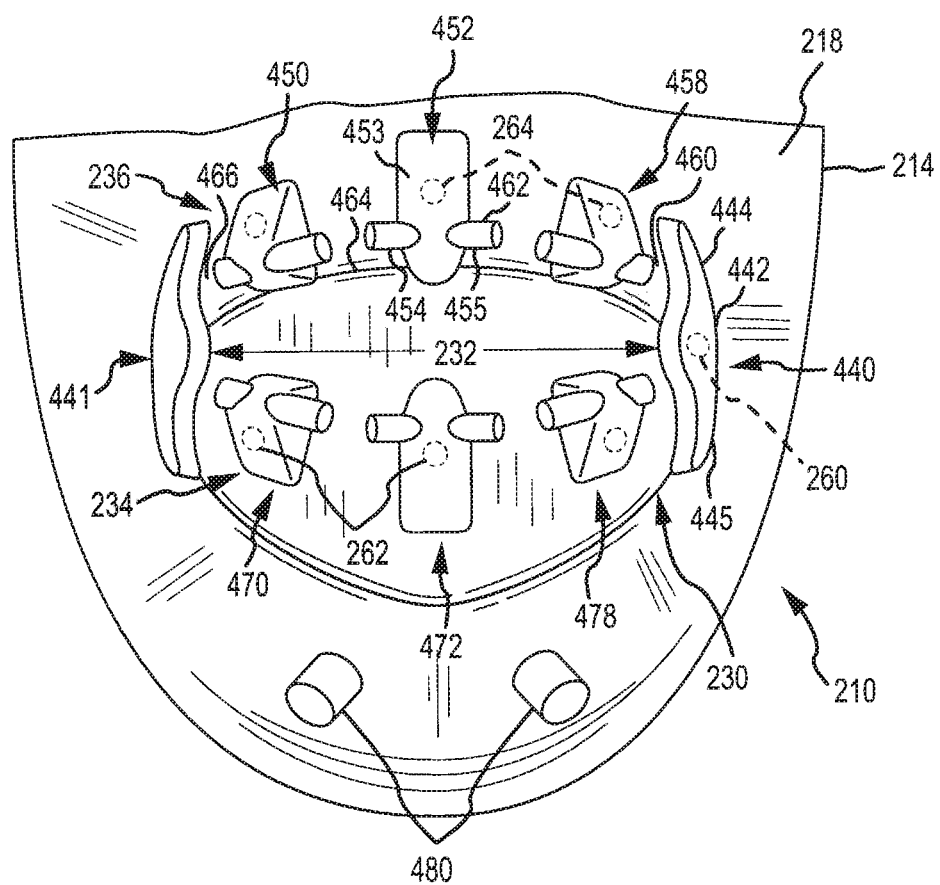
FIG. 4 illustrates, similar to FIG. 3, a front view of a portion of the mold core of FIG. 2 showing the bottom of the core (e.g., the portion containing the mouth and chin corresponding to like parts of a robotic assembly for which the skin is being fabricated to cover) after the application of locking and force-distributing EAPs onto the mounting posts of the core.

FIG. 4 illustrates the portion of the core 210 that includes the mouth portion 230 after the completion of steps 120, 130 to apply a plurality of EAPs to the mounting posts on the core exterior surface 218. One difficulty with animating mouths in robotic characters is cracking at the mouth corners 232. To address this issue, a pair of locking EAPs 440, 441 are provided on the mounting posts 260 such that these locking EAPs 440, 441 are positioned at the edges or cracks of the mouth in the skin formed with core 210. The EAPs 440, 441 act, when in use, to provide a connection point for the skin at the mouth edge/corner to a robotic outer shell/housing and also to block cracking. The EAPs 440, 441 may be circular button shaped as with other locking EAPs or, as shown, include a pair of arms or wings 444, 445 that extend outward from the cylindrical body 442 (which provides an attachment point to the mounting post 260). The arms or wings 444, 445 generally extend toward the nearby load-spreading EAPs 458, 478, and, as seen, are specially shaped and configured to suit the skin portion being replicated (e.g., a shape and movement (or lack thereof) of a human mouth in this case). The nearby EAPs 458, 478 (and 450, 470) are spaced apart by gaps 460, 466 such that they can be moved by a robotic driver independent of the stationary locking EAPs 440, 441.

Each of the lips 234, 236 provides three mounting posts 262, 264, and, as shown, three load-spreading EAPs 450, 452, 458, 470, 472, 478 connected and supported upon the core exterior surface 218 at these locations. As shown for the upper lip 236, it may be desirable to provide gaps or spacing 462, 464 between the EAPs 450 and 452 and 452 and 458 so as to provide a wider range of movement of a lip formed in skin using core 210 (when compared with prior use of a single lip tube inserted into the lip area of a skin). To further facilitate animation of the surrounding skin including better distribution of forces to avoid a point application of force, as shown with EAP 452, the EAPs may include a body 453 that provides a socket/receiver for mating with mounting post 264 (and, later, a robotic actuator/driver) such as a cylindrical body. From the body 453, the EAP 452 is shown to include a pair of wings or arms 454, 455 that extend outward toward the nearby or neighboring EAPs 452, 458. Upon pouring of skin material, these arms 454, 455 will extend away from the body 453 into surrounding skin material such that when the body is directly moved by a robotic driver the arms 454, 455 and bonded skin will also move. In this manner, the animating robotic force is distributed over a much larger area of the skin. When combined with the use of six lip drivers versus only two, the range of mouth and lip movement achievable with a skin formed to integrally include the EAPs shown in FIG. 4 is significantly greater than prior skin to robotics connection techniques and can much more realistically simulate human mouth and lip movements.

Referring again to FIG. 1, the method 100 continues at step 140 with assembling the mold including the core with EAPs from step 130. The step 140 includes providing an exterior mold assembly with inner surfaces defining exterior topography of a skin system, and the step 140 includes enclosing the core, such as core 210 of FIG. 4, within the exterior mold assembly. This results in a cavity associated with the skin being defined between the inner surfaces of the exterior mold components and the exterior surface of the core (e.g., the inner surfaces of the exterior mold components are at an offset distance defining the skin thickness from the exterior surface 218 of the mold 210).

At step 150, a volume of liquid skin-forming material (such as an elastomer such as silicone or another rubber) is poured into the mold cavity. This liquid material covers the surfaces of the inner core, such as surface 218 of core 210, including covering all of the EAPs supported on the core's surface. In step 160, the material is allowed to harden so as to create the skin or skin system. During such hardening, the EAPs bond with the poured material such that the EAPs are now an integral part of the skin. Hence, post-skin formation gluing and other fabrication steps are not required. In step 160, the mold is disassembled and the formed skin with integral EAPs is peeled off or removed from the core, which involves pulling each EAP off of its corresponding mounting post.

Figure 5:
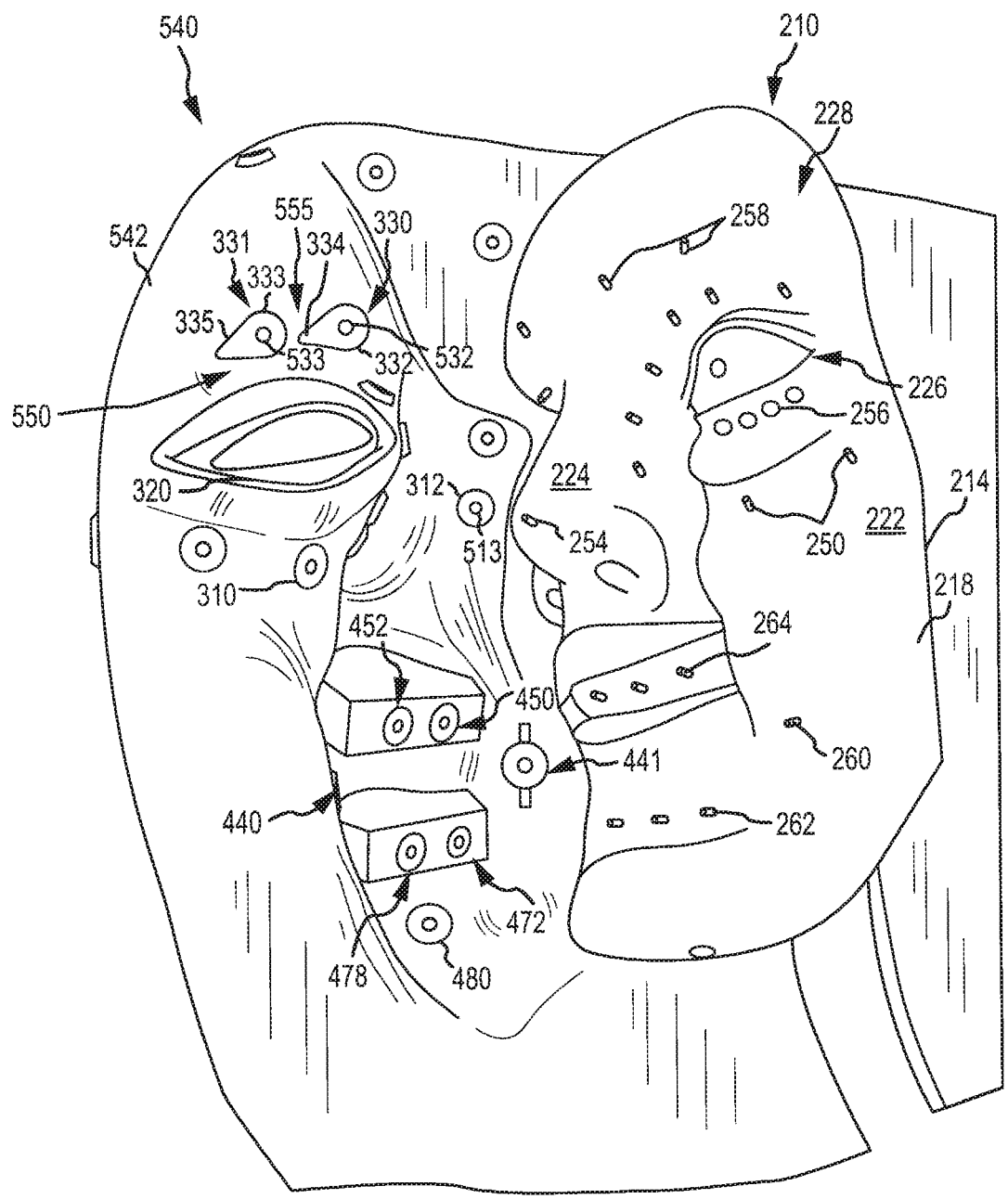
FIG. 5 illustrates the core of FIGS. 2-4 after a skin material pour, skin hardening, and disassembly of the mold assembly as the skin or skin system with the integral EAPs is being removed from or peeled off of the exterior surface of the core and EAPs are pulled off of the mounting posts.

FIG. 5 illustrates step 160 of method 100 in which core 210 has been used to locate and provide a plurality of EAPs. Specifically, the EAPs that were shown in FIGS. 3 and 4 to be applied on the core's mounting posts/elements have been integrally bond into a formed skin or skin system 540. The skin 540 is being removed from core 210 and exposes the inner surface 542 of the skin 540. The EAPs generally are at least partially exposed on inner skin surfaced 542 such that the EAPs can be applied over a robotics assembly as called for in step 170 of method 100. The robotics assembly is not shown but would take a form and shape similar to that of core 210 with the surface 218 being provided with a hard outer shell. The robotics assembly would include mounting posts/elements with similar (or even identical) configuration and location as the mounting posts/elements of core 210. The method 100 then ends at 190, and the robotics assembly may be operated to animate the skin 540 in a realistic manner via the EAPs.

With reference to the eyebrow simulating portion of the skin 540, the skin 540 as formed includes the EAPs 330, 331, which are bonded to the surrounding skin 550, 555 such that when the EAPs 330, 331 are moved so is the skin 550, 555. The skin 540 may be readily attached and detached from a robotics assembly that is configured with mounting elements similar to those provided on core 210. For example, each of the EAPs 330, 331 has a body 332, 333 with an opening to a recessed surface or socket 532, 533, which has a size, shape, and depth that is selected to match a mounting or connection element of a robotics assembly (e.g., a ball or similar shape on the end of a drive or actuator rod/arm or the like).

Also, the bodies 332, 333 may be formed of relatively hard materials such as vulcanized rubber such that when the EAPs 330, 331 are applied to a metal or other material post they snap in place in an elastic manner that provides tactile and audible feedback to a technician applying the skin to the robotics assembly. Hence, the skin 540 is easy to align with a robotics assembly's outer surface and its mounting elements, and proper connection is readily verified. Similarly, the other EAPs such as the EAP 312 on the "nose" of the skin 540 has an opening or socket 513 that is accessible via back or inner surface 542 of the skin 540, and the skin 540 can be locked or attached to a robotics assembly's outer shell with a post provided on the shell surface similar to post 254 on nose 224 of core 210. In this way, the skin surface 542 at the location of the locking EAP 312 is bound to the shell outer surface causing the surrounding skin to stretch and compress with movement of the surrounding load-spreading EAPs (e.g., the skin 540 of the nose may stretch when the mouth EAPs 450, 452 are moved away from the nose EAP 312).

Figure 6:
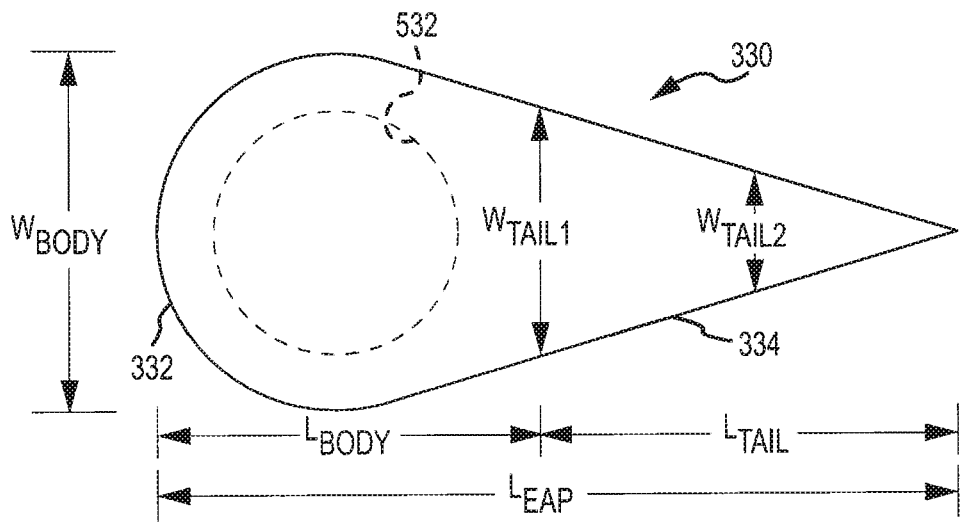
FIG. 6 illustrates in more detail a load-spreading EAP that includes a single tail (wing, arm, or the like) extending outward from its body (in this case, a circular body with a recessed surface or socket for receiving a core's mounting post, which takes the size and shape of a robotic actuator's linking end (such as a ball on the end of a drive or manipulator rod or arm))

As discussed above, the particular shape of an EAP may be varied widely to practice the invention. For force-distributing EAPs, it may be useful to provide a larger mating area with surrounding skin such that the force does not appear to be applied to the skin at a point (which typically is not the case in nature or for objects being simulated by robotics). For example, FIG. 6 illustrates the force-distributing EAP 330 that may be used as one of two or more eyebrow EAPs in some embodiments. As shown, the EAP 330 includes a body 332 that is generally circular in shape with a diameter that may correspond with the length, $L_{Body}$, of the body 332 and/or its width, $W_{Body}$. The EAP 330 typically is relatively thin such as ¾ down to ¼ of the thickness of the skin (e.g., ⅛ to ¼ inches or the like). The body 332 includes a recessed surface or socket defined by sidewall 532 for receiving and mating with a robotic actuator, and the sidewall 532 may have an inner groove(s) to further mate with a post or other coupling component of the actuator connector element.

The EAP 330 has an overall length, $L_{EAP}$, that is significantly greater than just the length, $L_{Body}$, of the body 332, and this additional length, $L_{Tail}$, is provided by an aim, wing, or tail 334 that extends outward from the body 332 to a tip. The tail 334 may have the same width, $W_{Body}$, as the body 332 or it may taper down from a width, $W_{Tail1}$, that is some value less than that of the body 332 down to a second width, $W_{Tail2}$, and then down to a point at the tip to define a raindrop or teardrop shape. Such a shape has proven valuable for distributing forces in a manner that may be associated with a tapered underlying structure or with a primary mover (such as a muscle) and secondary movers (such as less strong muscles). The reducing width of the tail cause it to distribute forces applied to body 332 via wall 532 in a unique manner (e.g., a flexible cantilevered member) that may be thought of as being skin animation that appears sympathetic with the skin structure and topography.

Figure 7:
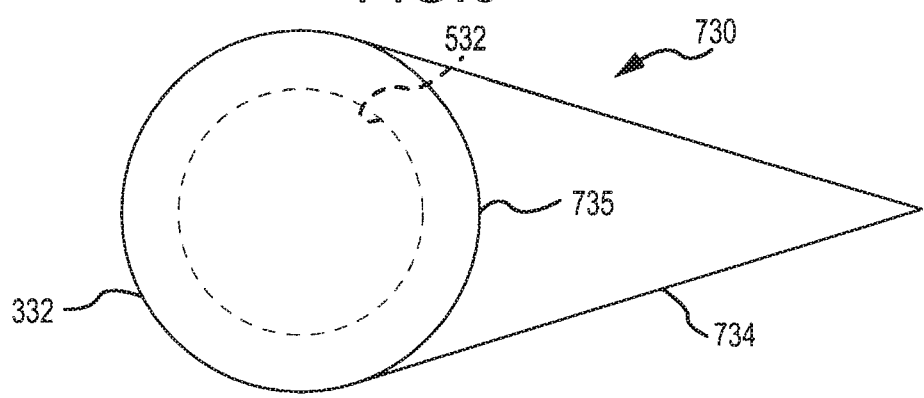
FIG. 7 shows an alternative load-spreading EAP similar to that shown in FIG. 6 but including a two-part instead of unitary configuration such that the body and wing/tail can be fabricated of differing materials and/or with differing hardness.

The EAP 330 may have a body 332 and tail 334 that are formed of the same materials and to have a uniform hardness. In some cases, though, it may be desirable to provide a body 332 with physical characteristics that differ from the tail. FIG. 7 illustrates an EAP 730 with the body 332 but with a tail 734 adjoined to it at seam 735 that is formed of another material or with differing processes so as to provide at least one differing physical characteristic. For example, the body 332 and tail 734 may both be made of a rubber such as a silicone, but the body 332 may be hardened such as by vulcanization or the like to have a greater hardness. This may be useful for providing harder mating surfaces on wall 532 for contacting robotics and/or for providing softer or more compressible material in tail 734 for distributing or spreading applied loads in a desired or more realistic manner.

FIG. 8 illustrates another useful EAP 830 that includes the body 332 and 334 as described with reference to FIG. 6 but that also includes a bearing member 840. The member 840 typically will be selected to have a greater hardness than the material of body 332 such that it provides enhanced durability of the EAP 830 and provides a contact/bearing surface with inner wall 842. The bearing member 840, for example, may have a 50 to 60 Durometer hardness while the body 332 has a 30 to 50 Durometer hardness to apply animating forces to surrounding (and integrally bonded) skin in a more realistic manner (e.g., to have a hardness that matches that of the surrounding skin so as to stretch and compress in a similar manner to better hide the use of the EAP 830 in a skin system). The harder bearing member 840 may be bonded to the body 332 of EAP 830 along the seam 845 at inner wall 532. The EAP 830 may be formed using a combined over mold process so as to provide the body 332 and tail 334 as a softer, more compliant material (e.g., rubber) while providing the bearing member 840 in the form of a harder, more durable contact element (e.g., a harder rubber, a plastic, a ceramic, or a metal element).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the EAPs have all been shown to have a socket or recessed surface (e.g., to provide a female coupling element) with the robotics and exterior surface of the robotics shell providing a post (e.g., to provide a male couple element). However, the EAPs could also be configured to include a post or other connection element, which could be temporarily mated with the exterior surface of the core. Also, the EAPs may include other materials than rubber and plastics as their bearing surfaces (or robotics mating/contact surfaces) such as a metal or ceramic link or bearing element.

The figures show the EAPs being separately provided and mounted onto the exterior surface of the core. However, in some embodiments, the set of EAPs for each skin or skin system are provided as a set formed on or attached to a lattice or similar support structure. In this manner, the set of EAPs may be provided on the lattice, and then all the EAPs on the lattice may be snapped on or attached to the mounting elements of the core. This may better ensure that the proper number and type of EAPs are used for a particular skin, and it may also facilitate proper positioning of the particular EAPs (e.g., mate the proper EAP to the nose mounting location and then the lattice helps align the neighboring EAPs and so on).

The above examples have provided examples of using skin systems of the invention with robotics, but the skin or covering systems of the invention are, of course, readily adaptable and useful in other applications in which it is desirable to cover a still or rigid frame or support structure or a dynamic or movable frame or support structure such as with materials having two or more hardnesses or differing flexibility and/or durability. As a result, the use of the term "skin" is not intended as being limited to human or animal imitating robots, toys, or devices, but it is instead to be inclusive of nearly any covering assembly or layered overlay that may be applied to or used as a covering (typically, but not always, an external covering).

In the assembled product or apparatus (e.g., the robotic character), the skin system with integral EAPs may be supported by structural members not shown in the figures (but similar in form as the core) including an inner shell or frame formed of rigid materials (such as plastic or fiberglass) to simulate rigid support found in nature such as a skull or other bone. The robotics may be housed within this support shell and extend through the shell to engage the skin system, e.g., the force receiving component, to manipulate the skin system to create desired animation such as facial expressions or speech. The support shell and driving/actuating robotics include mounting posts/elements similar in configuration and location to those found on the core such that the EAPs readily mount the skin to the robotics assembly (shell and internally positioned/housed components). Use of multiple EAPs (including a combination of locking and load-spreading EAPs) for the skin results in more realistic movement of the skin such as less obvious point source pushing and pulling where the robotics engage the skin system and such as skin distal to the robotic actuator connection points better simulating human and other skin in that it moves more as expected than prior skin systems.

The robotic assembly or robotics may include typical robotic software, hardware, and mechanical mechanisms and linkages used to perform programmed or controllable movements. In this regard, the robotics, for example, may include a mouth mechanism or a mechanism for simulating movements of a mouth, and, as such, include manipulators or skin driving members (e.g., upper and lower jaw or roof of mouth and bottom of mouth simulating elements extending from driving devices in robotics). The particular arrangement and configuration of the robotics is not limiting to the invention as the skin systems fabricated according to techniques of the invention, such as the method 100 of FIG. 1, may be used with numerous robotics or other devices such as those that impart force to provide a desired response (or look and feel) or that simply provide a skin/cover over a structural assembly.

In one embodiment, a hard shell or support frame may be included in the robot head to provide the structure of the head and to provide physical support for a soft skin system (such as skin 540) and to contain and hide the robotics. The hard shell may be rigid and is typically formed of a material such as a plastic (such as a polycarbonate/ABS mix or the like) but metals and/or alloys may also be used to form the shell. The shell may include a sidewall generally in the shape of the head (or skull) of the creature being simulated by the robot head.

As discussed, the skins with the integral EAPs (such as skin 540) may be created with a mold (e.g., a mold that is modeled based on scanned/determined surface geometry for skin 540 and fabricated using rapid prototype machines or other techniques) and pouring a variety of materials into that mold to form its shape or casting the part. The poured materials are generally elastic materials, but this is not required to practice the invention as it may be useful to provide a more rigid component with one or more components that are rigid. However, typically the components of the skin system will be elastic and flexible to allow manipulation by robotics. The materials used for the EAPs are chosen to be compatible to bonding integrally within surrounding skin material during the molding and pouring processes. The materials may be the same or differ for the EAPs and skin, with some embodiments choosing the same material but differing hardnesses for the EAPs and skin. The material may be a plastic or, more typically a polyurethane or rubber.

As discussed, it may be desirable to have the EAPs have differing hardnesses to achieve desired wear and desired movements. Hardness herein is intended to relate in part to flexibility or level of elasticity with EAPs (or portions of such EAPs) having a higher value of hardness being less elastic (and vice versa). Hardness is generally the resistance of a material to localized deformation and may apply to deformation from indentation, scratching, cutting, or bending. For elastomers, rubbers, and some polymers (that may be used for components in skin system), hardness may be thought of as the resistance to elastic deformation of the surface.

The fabrication method may use a variety of rapid prototyping techniques once a core geometry model is created and inner support structure components are designed and/or modeled such as using a CAD-based 3D computer modeling program/routine. One useful rapid prototyping technique that may be used to form inner support structure components or molds to facilitate casting of such parts is fused deposition modeling (FDM). In FDM, plastic parts, such as the robotics shell and/or the core with its mounting posts, may be manufactured by depositing or printing a filament on a layer by layer basis directly from 3D CAD or other modeling/design data (e.g., a file(s) containing geometric models or the like formed with a 3D CAD workstation or the like) provided to an FDM machine/device. For example, semi-liquid thermoplastic material (ABS) may be extruded and then deposited in thin layers from an FDM head one layer (or slice) at a time. The parts formed with FDM may have a rough surface finish, but this is typically acceptable for inner skin components and other parts such as the hard structural shell and robotics components. In other embodiments, rapid injection molding is utilized for some of the components, and this involves providing the 3D CAD part models to a rapid prototyping system that automates the process of manufacturing molds based on such models (e.g., by producing molds using aluminum or other alloys or materials and using precise, high-speed CNC machining such as three-axis CNC milling or other techniques).

We claim:

1. A method for fabricating an artificial skin system, comprising:
providing a mold core with an exterior surface defining an inner surface of a skin system, wherein the exterior surface comprises a plurality of mounting elements;
to each of the mounting elements, attaching an elastomeric actuation piece (EAP);
positioning the mold core within an exterior skin mold, wherein a cavity is formed between the exterior surface of the mold core and inner surfaces of the exterior skin mold that defines a topography and dimensions of the skin system and wherein the mounting elements are integrally formed with the exterior surface during fabrication of the mold core to be affixed to the exterior surface and extend a distance outward from the exterior surface into the cavity;
filling the cavity with a volume of a skin-forming material; and
after the skin-forming material hardens to form the skin system, removing the skin system from the mold core including detaching the EAPs from the mounting elements,
wherein the EAPs are integrally bonded within the skin system,
wherein the EAPs have at least two different body shapes distributing forces through the skin system in at least two different ways corresponding to the different body shapes of the EAPs,
wherein the mounting elements each comprise a post with a head distal to the exterior surface, and
wherein the EAPs each comprise a body with a recessed surface for receiving one of the heads of the mounting elements.

2. A method for fabricating an artificial skin system, comprising:
providing a mold core with an exterior surface defining an inner surface of a skin system, wherein the exterior surface comprises a plurality of mounting elements;
to each of the mounting elements, attaching an elastomeric actuation piece (EAP);
positioning the mold core within an exterior skin mold, wherein a cavity is formed between the exterior surface of the mold core and inner surfaces of the exterior skin mold that defines a topography and dimensions of the skin system;
filling the cavity with a volume of a skin-forming material; and
after the skin-forming material hardens to form the skin system, removing the skin system from the mold core including detaching the EAPs from the mounting elements,
wherein the EAPs are integrally bonded within the skin system,
wherein the providing of the mold core includes fabricating the mold core based on a robotics assembly including an outer shell with skin locking elements and a number of robotic actuators extending through the outer shell and further wherein a first number of the mounting elements of the mold core match a configuration and location of the skin locking elements and a second number of the mounting elements of the mold core match a configuration and location of linking elements of the robotic actuators, the skin locking elements remaining stationary on the outer shell while the robotics actuators operate to animate the artificial skin system,
wherein the first and second number of the mounting elements each comprise a post with a head distal to the exterior surface, and
wherein the EAPs each comprise a body with a recessed surface for receiving one of the heads of the first and second number of the mounting elements.

3. The method of claim 2, further comprising attaching the skin system to the robotics assembly by attaching the EAPs to corresponding ones of the skin locking elements and linking elements.

4. The method of claim 2, wherein a number of the EAPs mounted on the second number of the mounting elements include a body for mating with the linking elements of the robotic actuators and at least one wing, with a tapering width, extending outward from the body to distribute forces applied to the body outward into the surrounding skin system.

5. The method of claim 1, wherein each of the EAPs comprises a body with an outer wall formed of an elastomeric material and wherein the skin-forming material comprises an elastomer compatible with the EAP elastomeric material to provide the integral bonding during the filling step.

6. The method of claim 5, wherein at least a subset of the EAPs each includes a bearing element within the body adapted for mating with one of the mounting elements and wherein the bearing element is formed to have a hardness greater than a hardness of the body.

7. The method of claim 5, wherein after hardening the skin system has a first hardness and wherein the body of the EAPs has a second hardness greater than the first hardness.

8. The method of claim 7, wherein the second hardness is at least about a 50 Durometer hardness.

9. The method of claim 1, wherein the posts are configured such that the distance is less than about three fourths of a thickness of the cavity.

* * * * *